United States Patent
Hu et al.

(10) Patent No.: US 11,558,353 B2
(45) Date of Patent: Jan. 17, 2023

(54) METHOD, APPARATUS, AND COMPUTER READABLE MEDIUM FOR PROVIDING SECURITY SERVICE FOR DATA CENTER

(71) Applicant: Nokia Technologies Oy, Espoo (FI)

(72) Inventors: Zhiyuan Hu, Shanghai (CN); Jing Ping, Chengdu (CN); Stephane Mahieu, Munich (DE); Yueming Yin, Shanghai (CN)

(73) Assignee: Nokia Technologies Oy, Espoo (FI)

( * ) Notice: Subject to any disclaimer, the term of this patent is extended or adjusted under 35 U.S.C. 154(b) by 230 days.

(21) Appl. No.: 16/963,946

(22) PCT Filed: Feb. 6, 2018

(86) PCT No.: PCT/CN2018/075487
§ 371 (c)(1),
(2) Date: Jul. 22, 2020

(87) PCT Pub. No.: WO2019/153127
PCT Pub. Date: Aug. 15, 2019

(65) Prior Publication Data
US 2021/0044567 A1    Feb. 11, 2021

(51) Int. Cl.
*H04L 29/06* (2006.01)
*H04L 9/40* (2022.01)

(52) U.S. Cl.
CPC ...... *H04L 63/0245* (2013.01); *H04L 63/0236* (2013.01); *H04L 63/105* (2013.01); *H04L 63/1425* (2013.01); *H04L 63/20* (2013.01)

(58) Field of Classification Search
CPC ............ H04L 63/0245; H04L 63/0236; H04L 63/105; H04L 63/1425; H04L 63/20;
(Continued)

(56) References Cited

U.S. PATENT DOCUMENTS 6,292,900 B1    9/2001  Ngo et al.
9,563,782 B1    2/2017  Brisebois et al.
(Continued)

FOREIGN PATENT DOCUMENTS

CN    104780099 A    7/2015
CN    104994094 A    10/2015
(Continued)

OTHER PUBLICATIONS

Office action received for corresponding Chinese Patent Application No. 201880088692.6, dated Dec. 27, 2021, 7 pages of office action and no page of translation available.
(Continued)

*Primary Examiner* — Joseph P Hirl
*Assistant Examiner* — Ka Shan Choy
(74) *Attorney, Agent, or Firm* — Fay Sharpe LLP

(57) ABSTRACT

Embodiments of the present disclosure relate to a method, apparatus, and computer readable medium for providing a security service for a data center. According to the method, a packet terminating at or originating from the data center is received. At least one label is determined for the packet, each label indicating a security requirement for the packet. Based on the at least one label, a security service chain is selected for the packet, the security service chain including an ordered set of security functions deployed in the data center and to be applied to the packet. The packet is transmitted to the selected security service chain in association with the at least one label, the packet being processed by the ordered set of security functions in the security service chain.

20 Claims, 7 Drawing Sheets

(58) Field of Classification Search
CPC .............. H04L 63/0272; H04L 45/306; H04L 12/4645; H04L 63/0218; H04L 63/0263
See application file for complete search history.

(56) References Cited

U.S. PATENT DOCUMENTS

| | | | |
|---|---|---|---|
| 2003/0196108 A1 | 10/2003 | Kung | |
| 2004/0015701 A1 | 1/2004 | Flyntz | |
| 2005/0097357 A1* | 5/2005 | Smith | H04L 63/083 726/4 |
| 2006/0112425 A1* | 5/2006 | Smith | H04L 63/20 726/13 |
| 2007/0157307 A1 | 7/2007 | Katoh et al. | |
| 2007/0277034 A1 | 11/2007 | Livecchi | |
| 2014/0050223 A1* | 2/2014 | Foo | H04L 45/306 370/400 |
| 2015/0295826 A1 | 10/2015 | Sitharaman et al. | |
| 2015/0324609 A1 | 11/2015 | Grubel et al. | |
| 2016/0164776 A1* | 6/2016 | Biancaniello | H04L 69/22 370/392 |
| 2016/0277188 A1* | 9/2016 | Quinn | H04L 9/3213 |
| 2016/0294776 A1 | 10/2016 | Sun et al. | |
| 2016/0352629 A1* | 12/2016 | Wang | H04L 45/38 |
| 2017/0005920 A1 | 1/2017 | Previdi et al. | |
| 2017/0094002 A1* | 3/2017 | Kumar | H04L 67/2809 |

FOREIGN PATENT DOCUMENTS

| | | | | |
|---|---|---|---|---|
| CN | 106789542 A | 5/2017 | | |
| CN | 107222451 A | 9/2017 | | |
| WO | WO-2014101002 A1 * | 7/2014 | ......... | H04L 12/4633 |

OTHER PUBLICATIONS

Extended European Search Report received for corresponding European Patent Application No. 18904528.9, dated Aug. 18, 2021, 7 pages.
Quinn et al., "Network Service Header (NSH)", RFC 8300, Internet Engineering Task Force (IETF), Jan. 2018, pp. 1-40.
Housley, "Security Label Framework for the Internet", RFC 1457, Network Working Group, May 1993, pp. 1-14.
Hoffman, "Enhanced Security Services for S/MIME", RFC 2634, Network Working Group, Jun. 1999, pp. 1-58.
"Using Security Labels to Control Message Flow in XMPP Services", Isode, Retrieved on Jul. 2, 2020, Webpage available at : https://www.isode.com/whitepapers/controlling-message-flow.html.
"Azure Information Protection", Microsoft, Retrieved on Jul. 2, 2020, Webpage available at : http://download.microsoft.com/download/8/E/A/8EADA071-28E0-4456-BC2D-6826B959A7E0/Azure_Information_Protection_datasheet_EN-US.pdf.
"Oracle Label Security", Technical White Paper, 18c Oracle database, Mar. 2018, pp. 1-21.
"Wiserv", China Wiserv, Retrieved on Jul. 7, 2020, Webpage available at : http://www.chinawiserv.com/home/index/dashuju.html.
Bacon et al., "Information Flow Control for Secure Cloud Computing", IEEE Transactions on Network and Service Management, vol. 11, No. 1, Mar. 2014, pp. 1-14.
International Search Report and Written Opinion received for corresponding Patent Cooperation Treaty Application No. PCT/CN2018/075487, dated Oct. 26, 2018, 9 pages.

* cited by examiner

400

| 0 | | | 7 | | 15 | | | | | 23 | | 31 |
|---|---|---|---|---|---|---|---|---|---|---|---|---|
| VER | O | U | TTL | | LENGTH | U | U | U | U | MD TYPE | NEXT PROTOCOL | |
| SERVICE PATH IDENTIFIER ||||||||||| SERVICE INDEX ||
| FIXED LENGTH CONTEXT HEADER1 |||||||||||||
| FIXED LENGTH CONTEXT HEADER2 |||||||||||||
| FIXED LENGTH CONTEXT HEADER3 |||||||||||||
| FIXED LENGTH CONTEXT HEADER4 |||||||||||||

| 0 | | | 7 | | 15 | | | | | 23 | | 31 |
|---|---|---|---|---|---|---|---|---|---|---|---|---|
| VER | O | U | TTL | | LENGTH | U | DL | U | U | MD TYPE | NEXT PROTOCOL | |
| SERVICE PATH IDENTIFIER ||||||||||| SERVICE INDEX ||
| FIXED LENGTH CONTEXT HEADER1 |||||||||||||
| METADATA RELATED TO DATA LABELS |||||||||||||
| FIXED LENGTH CONTEXT HEADER3 |||||||||||||
| FIXED LENGTH CONTEXT HEADER4 |||||||||||||

LABEL-NSH

| 0 | 5 | 15 | 19 | 27 | 31 |
|---|---|---|---|---|---|
| SECURITY LEVEL LABEL IN TRANSIT (6 BITS) | LABEL OF INDUSTRY TYPE (10 BITS) | LABEL OF TECHNOLOGY (4 BITS) | LABEL OF GEOGRAPHY (8 BITS) | RESERVED (4 BITS) | |

|←────────── DATA SEGMENT LABEL (22 BITS) ──────────→|

LABEL-P&D

| 0 | 2 | 5 | 15 | 19 | 27 | 31 |
|---|---|---|---|---|---|---|
| SECURITY LEVEL IN USE (3 BITS) | SECURITY LEVEL AT REST (3 BITS) | LABEL OF INDUSTRY TYPE (10 BITS) | LABEL OF INDUSTRY TYPE (4 BITS) | LABEL OF GEOGRAPHY (8 BITS) | RESERVED (4 BITS) | |

|←────────── DATA SEGMENT LABEL (22 BITS) ──────────→|

Fig. 6

METHOD, APPARATUS, AND COMPUTER READABLE MEDIUM FOR PROVIDING SECURITY SERVICE FOR DATA CENTER

RELATED APPLICATION

This application claims priority to PCT Application No. PCT/CN2018/075487, filed on Feb. 6, 2018, of which is incorporated herein by reference in its entirety.

TECHNICAL FIELD

Embodiments of the present disclosure generally relate to the field of security service provision, and in particular, to a method, apparatus, and computer readable medium for providing a security service for a data center.

BACKGROUND

With the development of new technologies of Network Function Virtualization (NFV), Software Defined Networking (SDN), and Service Function Chain (SFC), network transformation may be inevitable for operators to make network programmable as well as to save cost. Consequently, more and more applications can be deployed rapidly and conveniently based on these new technologies.

The SFC technology enables service providers to deliver end-to-end services dynamically without having to change the underlying network topology. Security is one of challenges to deploy applications successfully using SFC since different types of data for the applications (especially for data centers) need different types of security. However, there is only a little research on security protection for applications using SFC.

Generally, in order to defend against rapid-increasing and evolving attacks (such as malware, Distributed Denial of Service (DDoS), and impersonation), customized security services or features have to be provided dynamically, flexibly and adaptively for application data at reset, data in use, and/or data in transit with different security requirements. However, traditional security appliances (for example firewalls, Intrusion Detection Systems (IDS), Deep Packet Inspection (DPI)) are implemented as hardware-based middleboxes and placed on fixed locations in the network, so it is difficult to meet different security requirements for different data based on the new technologies as mentioned above.

SUMMARY

In general, example embodiments of the present disclosure provide a solution for providing a security service for a data center.

In a first aspect, there is provided a method of providing a security service for a data center. The method includes receiving a packet terminating at or originating from the data center. The method includes determining at least one label for the packet, each label indicating a security requirement for the packet, and selecting, based on the at least one label, a security service chain for the packet, the security service chain including an ordered set of security functions that are deployed in the data center and to be applied to the packet. The method further includes transmitting the packet to the selected security service chain in association with the at least one label, the packet being processed by the ordered set of security functions in the security service chain.

In a second aspect, there is provided an apparatus for providing a security service for a data center. The apparatus includes a processor; and a memory coupled to the processor and storing instructions thereon, the instructions, when executed by the processor, causing the apparatus to perform acts. The acts include receiving a packet terminating at or originating from the data center. The acts include determining at least one label for the packet, each label indicating a security requirement for the packet, and selecting, based on the at least one label, a security service chain for the packet, the security service chain including an ordered set of security functions that are deployed in the data center and to be applied to the packet. The acts further include transmitting the packet to the selected security service chain in association with the at least one label, the packet being processed by the ordered set of security functions in the security service chain.

In a third aspect, there is provided a computer readable medium having instructions stored thereon. The instructions, when executed on at least one processor, cause the at least one processor to carry out the method according to the first aspect.

In a fourth aspect, there is provided a computer program product that is tangibly stored on a computer readable storage medium. The computer program product includes instructions which, when executed on at least one processor, cause the at least one processor to carry out the method according to the first aspect.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein:

FIG. 4 is an example of a structure of a traditional Network Service Header (NSH) with Fixed Length Context Headers;

FIG. 5A is an example of a structure of a NSH with Fixed Length Context Headers according to some embodiments of the present disclosure;

FIG. 5B is an example of a structure of a Fixed Length Context Header according to some embodiments of the present disclosure;

FIG. 6 is an example of a structure of a payload portion including data labels according to some embodiments of the present disclosure;

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

Figure 1:
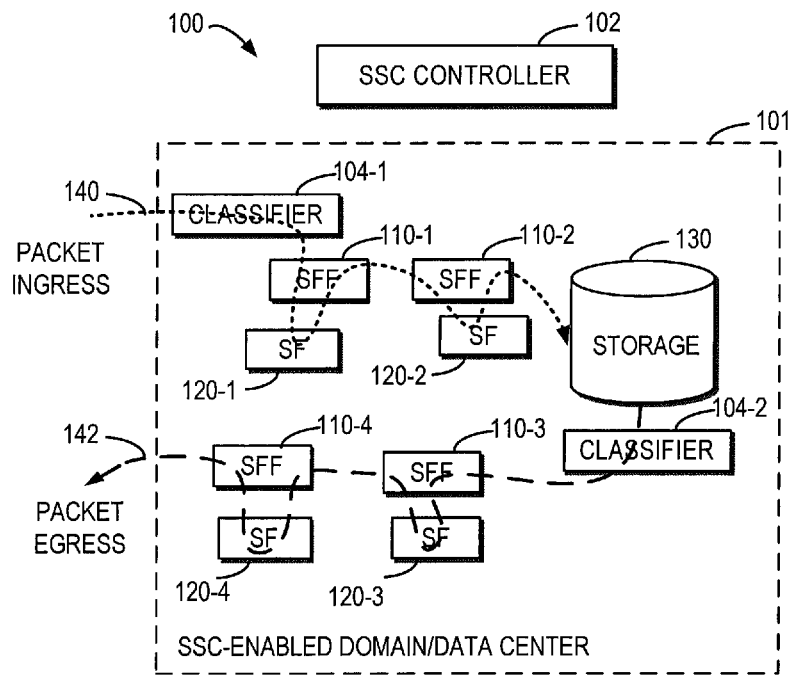
FIG. 1 is a block diagram of an example system for providing a security service in which embodiments of the present disclosure can be implemented.

FIG. 1 shows an example system 100 for providing a security service in which embodiments of the present disclosure can be implemented. The system 100 includes one or more controllers 102 which may be distributed across one or more physical hosts and/or one or more virtual hosts. The controller 102 is configured to control and configure function nodes within a data center 101. In FIG. 1, the controller 102 is responsible for managing a security service by creating and exposing a Security Service Chain (SSC), and thus is referred to as SSC controller 102.

A security service chain (SSC) is one type of service function chain (SFC), which defines an ordered set of security functions and ordering security policies that must be applied to packets and/or flows selected as a result of classification. A SSC enables security service providers to manage and operate stand-alone security services as well as to provide customized security services which can be integrated into other services such as Intelligent Transport System (ITS), video services and location services. In this way, service providers (for example, ITS service provider, video service provider, location service provider, and the like) can mainly focus on their own basic service logics and get professional security services from security service providers in order to provide secure services to the end users.

The data center where one or more SSCs can be established may be referred to as a Service Security Chain (SSC)-enabled domain or data center 101, as illustrated in FIG. 1. The SSC-enabled data center 101 includes a storage system 130, one or more function nodes, and a network connecting the storage system and the function nodes. In some examples, one or more data collecting points, which may collect data to be stored to the storage system 130, may be deployed within or externally to the SSC-enabled domain/data center 101. The SSC-enabled domain/data center 101 can provide security protection for data stored into or obtained from the storage system 130. The storage system 130 may include one or more physical storage devices to store the data, which may be distributed geographically in the same location or different locations (in the case of cloud based storage).

In the SSC-enabled domain/data center 101, there are a plurality of Security Functions (SFs) 120-1 to 120-4 and associated Service Function Forwarder (SFFs) 110-1 to 110-4, and one or more classifiers 104-1, 104-2 deployed therein. For clarity of discussion, SFs 120-1 to 120-4 may be individually or collectively referred to as SFs 120, SFFs 110-1 to 110-4 may be individually or collectively referred to as SFFs 110, and classifiers 104-1, 104-2 may be individually or collectively referred to as classifiers 104.

A SF 120 refers to a service function that is responsible for specific security protection of received packets. A service function can act at various layers of a protocol stack (for example, at the network layer or other OSI layers). As a logical component, a service function can be realized as a virtual element or be embedded in a physical network element. One or more service functions can be embedded in the same network element. Multiple occurrences of the service function can exist in the same administrative domain. One or more service functions can be involved in the delivery of added-value services. In a SSC-enabled domain, the SF 120 provides a service functionality of security protection, examples of which include, but are not limited to, firewalls, access control, entity authentication, unified threat management (UTM), intrusion detection system (IDS), intrusion prevention system (IPS), virtual private network (VPN), security gateway, Deep Packet Inspection (DPI), Lawful Intercept (LI), traffic cleaning, data integrity validation, data confidentiality protection, data desensitization, data encryption, data decryption, and the like.

In some embodiments, a SSC may include one or more security functions deployed in the network of the SSC-enabled data center 101. The security functions in the SSC may be deployed in a certain order to process data of the packets transported in the network. In addition to the security functions, in some embodiments, the SSC may also include other service functions (such as data mining, data analysis and data sharing) to provide corresponding services for the packets.

A SFF 110 refers to a service function forwarder is responsible for forwarding traffic to one or more connected service functions according to information carried in the SFC encapsulation, as well as handling traffic coming back from the SF. Additionally, an SFF is responsible for delivering traffic to a classifier when needed and supported, transporting traffic to another SFF (in the same or different type of overlay), and terminating the Service Function Path (SFP). The SFF forwarding policy of the SFF 110 may be generated and obtained or updated by the SSC controller 102.

A classifier 104 is a virtual function or a physical element that performs classification for any received packet or data. The classification policy may be provided by the SSC controller 102. The classifier 104 may determine which SSC a received packet will be passed through. FIG. 1 shows two example SSCs 140 and 142. The classifier 104-1 receives a data packet at the packet ingress and provides it into a SSC 140, which involves the SFF 110-1, SF 120-1, SFF 110-2, and SF 120-2. The data is processed by the SFs 120-1, 120-2 for security protection. If a data packet is read from the storage system 130, the classifier 104-2 receives this packet and provides it into a SSC 142, which involves the SFF 110-3, SF 120-3, SFF 110-4, and SF 120-4. Data in the packet is processed by the SFs 120-3, 120-4 for purpose of security protection.

It would be appreciated that the architecture in FIG. 1 is merely illustrated as an example. In some other examples, there may be more, less, or different logic functions included in the system 100. In some examples, some logic functions, such as the classifiers, the SFs, and/or the SFFs may be implemented as the same logic functions or implemented in the same physical elements. Although shown as separated paths, the SCCs 140 and 142 may include some overlapped security functions to apply the same security protection for incoming and outgoing packets of the storage system 130.

Typically, Data Service Providers (DSPs) of data centers offer data services (such as cloud based data service) to vertical market through collecting diversity data from various data resources (such as healthcare, public safety, real estate, transportation, and utilities). In order to obtain profits from the stored data, the DSP analyses raw data and provides value-added services for their customers, as well as shares analyzed/processed data with partners and customers in vertical market. In this way, the partners and customers can further perform data mining and provide value-added services (for example, personal targeted advertising, market trend analysis). However, data storage, data mining, data analysis and data sharing should meet security requirements and regulatory requirements such as GDPR (General Data Protection Regulation) and Cybersecurity laws.

Currently the industry of data centers has many security solutions to provide security protection for both data at rest (stored data) and data in use (data to be accessed). It's also very important for the DSP to provide customized security protection for data in transit, such as data transportation from collecting points to a datacenter or data transportation within/across datacenters. For example, some data needs only integrity protection during transportation, while some data needs both integrity and confidentiality protection during transportation. Although some security mechanisms such as VPN (Virtual Private Network) have been used to provide security protection for data in transit, all data with different security requirements is protected with the same security level (for example, using the same security algorithm, same encryption key, same integrity key, same security filtering policy, and the like), which cannot meet the security requirements for highly sensitive data. Moreover, there may be man-in-the-middle attacks since there is no logical data isolation so that VPN clients and servers are able to know all data. Sometimes different types of data, including public and secret information, may also need to be stored and isolated logically or physically.

In addition, the DSPs may offer cloud based data services and stores data with diversity data formats which adopt different existing security solutions to provide security protection for both data at rest and data in use. Thus, it's important for the DSPs to create a unified mechanism to enable data interoperability or distributed data combination between data stored in different data formats with different data security labels. Further, some DSPs offer cloud based data services and store data with some data formats (such as some self-defined databases) which has no feasible security protection solutions for data at rest or data in use. It is also desired for those DSPs to create data labeling schemes which enable security protection for data at rest and data in use as well as data in transit.

According to embodiments of the present disclosure, there is proposed a solution for providing a security service for a data center. According to this solution, a unified data labeling scheme is provided to label a packet terminating at or originating from the storage system. Each label determined for the packet indicates a security requirement for the packet. On the basis of the determined label(s), a security service chain (SSC) is selected for the packet. The SSC includes an ordered set of security functions deployed in a network the storage system and to be applied to the packet. The packet is then transported to the SSC and is processed by the set of security functions in the SSC. In this way, it is desirable to provide customized security services or features dynamically, flexibly, and adaptively for packets of the storage system with different security requirements.

Figure 2:
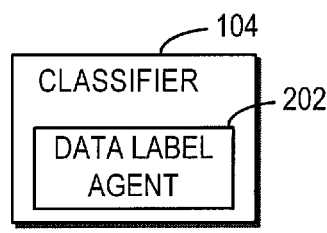
FIG. 2 is a block diagram of a classifier of FIG. 1 according to some embodiments of the present disclosure.

Embodiments of the present disclosure can be implemented in a system that provides networking security protection functions, for example, the system 100 of FIG. 1. More specifically, a data labeling scheme can be implemented in the system 100 of FIG. 1. In some embodiments, the system 100 may include a data label agent to implement the data labeling scheme for received packets. As shown in FIG. 2, the classifier 104 may include a data label agent 202 to determine the label(s) for the packet. If a packet terminating at or originating from the data center 101 is received, the data label agent 202 in the classifier 104 determines one or more labels for the packet, each label indicating a security requirement for the packet. The label(s) can be used by the classifier 104 to select a SSC to which the packet is to be transmitted. There may be one or more SSCs that have been established in the SSC-enabled domain/data center 101. If a selected SSC is not established, the SSC controller 102 may control the establishment of the SSC.

It would be appreciated that although the data label agent 202 is illustrated as being included in the classifier 104, in some other embodiments, the data label agent 202 and the classifier 104 may be implemented as separate functions. The data label agent 202 and the classifier 104 may be deployed in the same host or implemented in stand-alone hosts as separate functions. In the latter case, the data label agent 202 may be deployed in the SSC-enabled domain/data center 101 in upstream of the classifier 104. In this way, the data label agent 202 may receive the packet and determine the label(s) for the packet. The determined label(s) may then be used by the classifier 104 to select the SSC for the packet.

The classifier 104 may receive a packet includes data to be stored into the storage system 130, or a packet includes stored data that is read from the storage system 130. The classifier 104 may also receive a packet including an access request for data that is stored in the storage system 130. The received packet may include authentication and/or authorization data. The label(s) determined for the packet is used to ensure that the data included in the packet or to be accessed by the packet may be securely handled. Thus, a label determined by the data label agent 202 in the classifier 104 may sometimes be referred to as a data label.

According to embodiments of the present disclosure, when selecting the SSC based on the label(s) determined by the data label agent 202, the SSC may be selected such that at least one security function in the ordered set can be applied to process the packet to meet the security requirement indicated by the determined label(s). In some embodiments of the present disclosure, there may be a set of predefined labels in the system 100, each indicating a specific security requirement. The classifier 104 may select one or more predefined labels for the received packet. Different subsets of labels may be defined to indicate security requirements of a packet from different aspects. The security requirements indicated by the predefined labels as well as how to meet the security requirements by means of selecting corresponding SSC will be discussed in details below.

Figure 3:
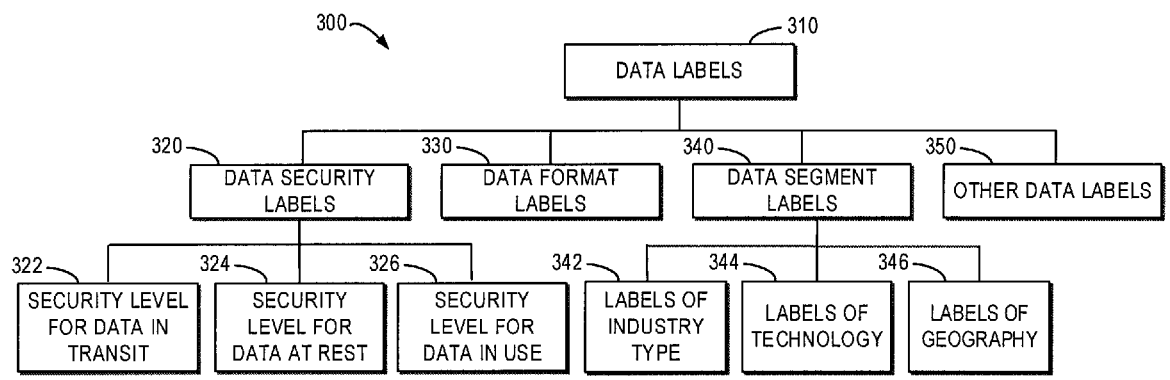
FIG. 3 is a schematic view of a data labeling scheme 300 according to some embodiments of the present disclosure.

FIG. 3 illustrates an example of a data labeling scheme 300 according to some embodiments of the present disclosure. As shown in FIG. 3, data labels 310 may be divided into a subset of data security labels 320, a subset of data format labels 330, a subset of data segment labels 340, and other data labels 350. The data security labels 320 may be divided into a subset of security level labels for data in transit 322, a subset of security level labels for data at rest 324, and a subset of security level labels for data in use 326. The data segment labels 340 may be divided in to a subset of labels of industry type 342, a subset of labels of technology 344, and a subset of labels of geography 346.

Different security level labels for data in transit 322 indicate different security requirements for transmission (transportation) of a packet, especially for transmission of payload included in the packet. According to the security level labels for data in transit 322, it would be possible to identify whether security protections for traffic processing, such as integrity protection, confidentiality protection, virus removal, and other security algorithms, need to be applied to the packet during the transportation. Table 1 provides a list of some security level labels for data in transit and their associated security requirements. It would be appreciated that the labels and security requirements are listed in Table 1 for purpose of example only. A different number of security level labels and different security requirements may be predefined as long as the security requirements need to be satisfied during data transportation.

TABLE 1

Examples of the security level label for data in transit and associated security requirements

| Security level label for data in transit | Security requirement |
|---|---|
| Security-level-transit-0 | No integrity or confidentiality protection |
| Security-level-transit-1 | Integrity protection |
| Security-level-transit-2 | Confidentiality protection |
| Security-level-transit-3 | Both integrity and confidentiality protection |
| Security-level-transit-4 | Both integrity and confidentiality protection, and security algorithms with key length of 256 bits or 512 bits |

By selecting the SSC based on the security level labels for data in transit 322, customized security services can be provided for data transportation from data collecting point to the storage system, data transportation from the network perimeter to the physical storage devices of the storage system 130 and data transportation across geo-distributed storage system. As compared to the transitional solutions which can only provide security protection for data at rest and data in use, the security level labels for data in transit 322 may further improve the security of data during transportation.

Different security level labels for data at rest 324 indicate different security requirements for storage of data in the storage system 130. If the packet includes data to be stored into the storage system 130 or includes data obtained from the storage system 130, a security level label 324 may be determined for this packet. According to the security level labels for data at rest 324, it would be possible to identify whether security protections for data processing, such as storage with Data Integrity validation, storage with confidentiality protection (encryption), data privacy protection, Data Desensitization, the storage mode, and other security algorithms, need to be applied to the packet. In this way, customized security service and countermeasure could be applied for data at rest according to the security level label 324. For example, by selecting the SSC based on the security level labels 324, one or more security functions in the SSC can be selected based on the security level labels 324 to meet the corresponding security requirements. As another example, the SSC is selected such that the SSC is connected to a storage region or storage device of the storage system 130 in the data center 101 that meets the corresponding security requirements indicated by the security level label 324.

Table 2 provides a list of some security level labels for data at rest and their associated security requirements. It would be appreciated that the labels and security requirements are listed in Table 2 for purpose of example only. A different number of security level labels and different security requirements may be predefined as long as the security requirements need to be satisfied for data storage.

TABLE 2

Examples of the security level label for data at rest and associated security requirements

| Security level label for data at rest | Security requirement |
|---|---|
| Security-level- rest-0 | Stored in the cloud without any data process |
| Security-level- rest-1 | Stored in the cloud with integrity protection (for example, adding one metadata to support Data Integrity validation) |
| Security-level- rest-2 | Stored in the cloud with confidentiality protection (for example, data encrypted at rest) and privacy protection (for example, Data Desensitization or de-identification) |
| Security-level- rest-3 | Stored in the cloud with integrity and confidentiality protection as well as privacy protection (for example, Data Desensitization) |
| Security-level- rest-4 | Stored in the cloud with integrity and confidentiality protection as well as privacy protection (for example, Data Desensitization), and security algorithms with key length of 256 bits or 512 bits. Moreover, data storage should be isolated logically or physically, and jurisdiction of data storage should be complied with geographic regulation. |

Different security level labels for data in use 326 indicate different security requirements for access of data in the storage system 130. If the packet includes data to be stored into the storage system 130 or includes data obtained from the storage system 130, a security level label 326 may be determined for this packet. According to the security level labels for data in use 326, it would be possible to identify whether security protections related to data access control need to be applied to the packet when selecting the SSC. Table 3 provides a list of some security level labels for data in use and their associated security requirements. It would be appreciated that the labels and security requirements are listed in Table 3 for purpose of example only. A different number of security level labels and different security requirements may be predefined as long as the security requirements need to be satisfied for data access.

TABLE 3

Examples of the security level label for data
in use and associated security requirements

| Security level label for data in use | Security requirement |
|---|---|
| Security-level- use-0 | No access limitation, anyone has the right to modify, update or delete the data |
| Security-level- use-1 | Data accessed with no modification, or updates, or deletion. Only data owner has the right to modify the data |
| Security-level- use-2 | Data accessed only by authenticated and authorized users/applications |

TABLE 3-continued

Examples of the security level label for data
in use and associated security requirements

| Security level label for data in use | Security requirement |
|---|---|
| Security-level- use-3 | Data accessed only by authenticated and authorized users/applications with no modification, or updates, or deletion. Only data owner has the right to modify the data. |
| Security-level- use-4 | Data accessed only by authenticated and authorized users/applications with no modification, or updates, or deletion. Only data owner has the right to modify. Moreover, users and applications have to be authenticated with strong authentication methods (for example, two-factor authentication, multi- factor authentication) |

Also referring to FIG. 3, the data segment labels 340 may be divided in to a subset of labels of industry type 342, a subset of labels of technology 344, and a subset of labels of geography 346. If the packet includes data to be stored into the storage system 130 or includes data obtained from the storage system 130, a data segment label 340 may be determined for this packet. Among the data segment labels 340, different labels of industry type 342 may indicate different security requirements associated with different industry types of data. Different labels of technology 344 may indicate different security requirements associated with different technology being used by the data center 101 (more specifically, the storage system 130) for storing the data in the packet. Different labels of geography 346 may indicate different security requirements associated with different geographic locations where data in the packet were generated and/or stored. In some embodiments, a label 342, 344, or 346 may explicitly indicate the industry type, technology, or geographic location of the data in the packet, and the industry type, technology, or geographic location may in turn implicitly correspond to different security requirements. Table 4 provides a list of labels of industry type, for technology, and for geography. It would be appreciated that the labels and security requirements are listed in Table 4 for purpose of example only. A different number of labels may be predefined for different industries, different technologies, and different geographic locations.

TABLE 4

Examples of data segment labels and corresponding data classifications

|  | Data segment Labels | Data classifications |
|---|---|---|
| Labels of industry type | Segment-industry-1 | Healthcare/Pharma, for example, data security level labels "security-level-transit-4", "security-level-rest-4" and "security-level-use-4" can be set for this type of data by default |
|  | Segment-industry-2 | Transportation/Distribution |
|  | Segment-industry-3 | Smart cities |
|  | Segment-industry-4 | Home monitoring |
|  | Segment-industry-5 | Finance |
|  | Segment-industry-6 | Energy/Utilities |
| Labels of technology | Segment-technology-1 | Data stored in dedicated physical storage devices |
|  | Segment-technology-2 | Data stored in the cloud |
| Labels of geography | Segment-geography-1 | Datacenter in Germany |
|  | Sgement-geography-2 | Datacenter in China |
|  | Sgement-geography-3 | Datacenter in place C |

In some embodiments, different types of data segment labels 340 may be determined for one packet. For example, a packet may be labeled with one or more of the labels 342, 344, and 346, depending on the industry, storage technology, and geographic location of data included in the packet. For example, for healthcare data stored in AWS for Germany citizen, segment-industry-1, segment-geography-1 and segment-technology-2 will be labelled on the data. However, only one label with the same type can be set on the same data at the same time. For example, it's not necessary to set both segment-industry-1 and segment-industry-2 labels on the same data.

Different labels 342, 344, 346 may indicate different security requirements because different policies or constrain can be adopted by the data sources from different industries, geographies, technologies, and/or other segments although they have same security level label. Thus, it would be helpful for the subsequent security protection if there is a label indicates the security requirement associated with a certain industry, technology or geographic location. In some embodiments, transportation, storage and/or access of data from different industries may comply with different industrial regulations. By way of examples, data from the industry of Healthcare/Pharma may comply with Health Insurance Portability and Accountability Act (HIPAA); data from the industry of finance may comply with Payment Card Industry Data Security Standard (PCI-DSS); data from Germany may comply with General Data Protection Regulation (GDRR); data from China may comply with Chinese Cybersecurity Law; and data stored in the cloud may comply with ISO 27017.

In some embodiments, by labeling the packet with the data segment labels 340, the mandates and directions defined in the associated regulations should be applied on the data for data at rest, in use and in transit. For example, some security functions such as Firewall and DPI (Deep Packet Inspection) scan a packet according to data segment labels 340, and then decide what operation (for example, forwarding, dropping, and/or the like) should be performed next. According to regulation compliances in some geographic regions or countries, financial data is scanned only by a dedicated DPI or Firewall.

In some embodiments, in addition to being used for selecting the SSC for a packet, the data segment labels 340 can also be used to determine whether data from different industries, different geographic locations, and stored (or to be stored) using different storage technologies can be separated logically or physically when they are stored and/or transmitted. The restriction of data storage and/or transmission can be controlled by the SSC controller 102.

In an embodiment, packets with different data segment labels 340 (indicating different geographic locations of the data, different storage technologies used for data storage, and/or industry types of the data) may be separated logically or physically by transmitting through different network zones within the network of the data center 101. In this way, for a certain packet with a data segment label 340, the data included in the packet may be prevented from being transmitted through a network zone where a further packet with a different data segment label 340 is transmitted.

In an embodiment, according to the data segment labels 340, some data may be restricted in certain regions according to regulation compliances in some geographic regions or countries. The data segment labels 340 may help achieve such restriction of data transmission. Specifically, according to the data segment label 340 determined for the packet received by the system 100, data included in the packet may be prevented from being transmitted into a first predetermined geographic region or outside a second predetermine geographic region. For example, data generated in China is limited to be forwarded out of China according to Chinese Cybersecurity Law.

Alternatively, or in addition, packets with different data segment labels 340 (indicating different geographic locations of the data, different storage technologies used for data storage, and/or industry types of the data) may be separated logically or physically by storing into different storage regions. In this way, for a certain packet with a data segment label 340, the data included in the packet may be prevented from being stored into a storage region of the storage system 130 of the data center 101 for storing data included a further packet with a different data segment label 340. Further, limited storage in specified geographic locations (specific jurisdiction) may be applied based on the data segment labels 340. For example, a packet with a certain data segment label 340 may be prevented from being stored into a storage region in a prohibited geographic location. For example, according to regulation compliances in some geographic regions or countries, data labelled with a certain geographic location may not be stored into a storage region outside the particular geographic region (jurisdiction). As a specific example, financial data generated in China is isolated from other data traffic during transportation, and is stored in isolated and physical storage devices located in China.

In some embodiments, the data segment labels 340, which can be easily determined by classifying data included in the packet, can be used to help determine the data security labels 320. For example, it's a possible that data owners do not know how to set a security level for their data or fail to set a security level for their data correctly. Data segment labels 340 could assist them in automatically or manually mapping the segment label 340 to a security level label (in transit, at rest, and/or in use) because data segment labels 340 can implicitly indicate basic/minimum security requirements for the data. For example, data of patient medical records belongs to healthcare segment. According to data segment labels 340, data security labels "security-level-transit-4" 322, "security-level-rest-4" 324 and "security-level-use-4" 326 may be assigned to data of patient's medical records in order to comply with the HIPAA regulation compliance and customer security requirements. In this way, data security labels can be determined quickly.

Still referring back to FIG. 3, data labels 310 further includes data format labels 330. Different data format labels 330 indicate a format of the packet. Packets from different types of storage systems (datacenters) may be generated in different formats and thus may probably be labeled using existing data labeling schemes. The data format labels may be defined as the types of the databases from where the data in the packets are obtained. The databases may support existing data label schemes or the data label scheme proposed in this disclosure. In some embodiments of the present disclosure, it is proposed to provide a unified data labeling scheme, and thus by means of the data format labels 320, it is possible to perform conversion between the existing data labels and those proposed in this disclosure. Although the data format labels indicate the security requirement for the packets, they can otherwise help improve data interoperability or distributed data combination.

It would be appreciated that although some data labels have been discussed above, there may be other data labels that can be defined and used to label packets by the data label agent 202. For example, some data labels may be defined to indicate the data owner, data usage tracking, data distribution tracking, data monitoring, data timestamp, data original source, and the like.

Among the set of predefined data labels 310, the data label agent 202 in the classifier 104 may determine one or more of the following labels for the packet: a first label 322 indicating a security requirement for transmission of the packet in the SSC, a second label 324 indicating a security requirement for storage of data in the storage system, and a third label 326 indicating a security requirement for access of data in the storage system, and one or more fourth labels (342, 344, and/or 346) indicating a security requirement associated with an industry type of the data, a storage technology being used by the storage system 130 for storing the data, and a geographic location of data included in the packet. In some embodiments, the data label agent 202 in the classifier 104 may also determine a further label (a data format label 330) to indicate a format of the packet associated with a further storage system from which the packet is received. If data in the packet is collected from the data collecting points, such data format label may be omitted.

In some embodiments, when the data label agent 202 in the classifier 104 determines one or more data labels 310 for the received packet and transmit the packet to the SSC selected based on the data labels 310, the determined labels may be transmitted in association with the packet. In some embodiments, some of the data labels 310 may be inserted in a header of the received packet by the classifier 104. Typically, the header of the packet is used for transportation and will be discarded when the payload of the packet is stored into the storage system 130. Thus, one or more data labels 310 indicating the security requirements to be satisfied during data transportation may be inserted into the header of the packet and then the packet with the modified header may be transmitted by the classifier 104. For example, a security level label for data in transit 322, a label of industry type 342, a label of technology 344, and/or a label of geography 346 may be inserted into a header of the packet.

In one example, Network Service Header (NSH) with MD Type=0x1 (that is, Fixed Length Context Headers) defined in [IETF draft-ietf-sfc-nsh] may be extended as an example to support the insertion of one or more data labels 310. FIG. 4 illustrates a structure of a traditional NSH 400 with Fixed Length Context Headers. As shown, the NSH 400 includes five unassigned bits marked as "U" in NSH Base Header and four Fixed Length Context Headers 1 to 4.

FIG. 5A illustrates an example extension of NSH 500, where one of the five unassigned bits is used to indicate whether this NSH is a general NSH defined in [IETF draft-ietf-sfc-nsh] or extended NSH in this invention. For this invention, the third unassigned bit marked as "U" in NSH Base Header is chosen and marked as "DL" as for an example. In addition, one of the fixed length context headers is extended to support customized data service security based on data labelling. In the example of FIG. 5A, Fixed Length Context Header2 is selected as for an example and used to carry metadata related to data labels 310. In some examples, NSH related to data labels 310 may also be referred to Label-NSH.

An example of the labels included in the Fixed Length Context Header2 510 of the NSH 500 is illustrated in FIG. 5B. As shown, a security level label for data in transit 322, a label of industry type 342, a label of technology 344, and/or a label of geography 346 are inserted in the Fixed Length Context Header. The number of bits used to indicate the labels may be depending on the total number of labels in different types.

It would be appreciated that although NSH with fixed length context headers is discussed above as an example, NSH with MD Type=0x2 (with Variable Length Context Headers) and other types of packet headers may also be extended to support the data labels 320. It would also be appreciated that the selection of the header and the arrangement of the data labels in the header are only illustrated for purpose of example only, and many other selections and arrangement may be defined. In some examples, if one or more of the labels are not determined by the data label agent 202 in the classifier 104, the corresponding bits in the header of the packets may be null.

According to the embodiments of the present disclosure, by extending the NSH to add the data labels into the NSH as metadata, fine-grained Security Service Chain (SSC) classification rules may be created based on the data labels and the extended NSH. In this way, customized security services can be offered for labelled data in transit, for example, when the data is imported from a data collecting point to a storage system, transported between network perimeters of the storage system and data storage devices, transported across Geo-distributed storage systems or various sub-systems. In addition, the traffic may be separated logically or physically based on the label in the NSH by selecting the separated SSCs or SSC terminating at different physical storage devices in the system.

In some embodiments, some of the data labels 310 determined by the data label agent 202 in the classifier 104 may be inserted in a payload part of the received packet. Typically, data of the packet is included in the payload part and this part will be stored into the storage system 130. Thus, one or more data labels 310, which indicate the security requirements to be satisfied during data storage and/or data access, may be inserted into the payload part of the packet by the data label agent 202. Then the packet with the modified payload may be transmitted by the classifier 104.

In some embodiments, a security level label for data at rest 324, a security level label for data in use 326, a label of industry type 342, a label of technology 344, and/or a label of geography 346, and a data format label 330 may be inserted into the payload part of the packet. The data payload related to the data labels 310 may be referred to as Label-P & D. The data labels 310 in the payload of the packet may also be referred to as payload metadata and database metadata (since the payload may be stored into the storage system 130). Data labels 310 added as database metadata can support access control for data in use. Data labels 310 added as payload metadata can support security policy enforcement according to data labels during transportation and support data labels together with data being stored in the database. In some embodiments, the data labels 310 may be added as visible or invisible metadata element(s) in the storage system 130.

FIG. 6 illustrates an example of a payload portion 600 including the data labels 310. It would also be appreciated that the arrangement of the data labels in the payload are only illustrated for purpose of example only, and many other arrangements may be defined. In some examples, if one or more of the labels are not determined by the data label agent 202 in the classifier 104, the corresponding bits in the payload of the packets may be null.

According the embodiments of the present disclosure, by extending the payload during data storage, data labels added as payload metadata and database metadata can support security policy enforcement according to data labels during transportation and support data labels together with data being stored in the database. Data labels added as database metadata can support access control for data in use. In addition, based on the database metadata and payload metadata, the data may be isolated logically or physically in storage. The data format labels in the payload may also enable data interoperability or distributed data combination between data stored in different data formats.

In some embodiments, the data label agent 202 in the classifier 104 may determine one or more data labels for the received packet based on (1) whether the packet include any labels and (2) whether the included labels belong to the predefined data labels of the present disclosure, such as those shown in FIG. 3.

Figure 7A:
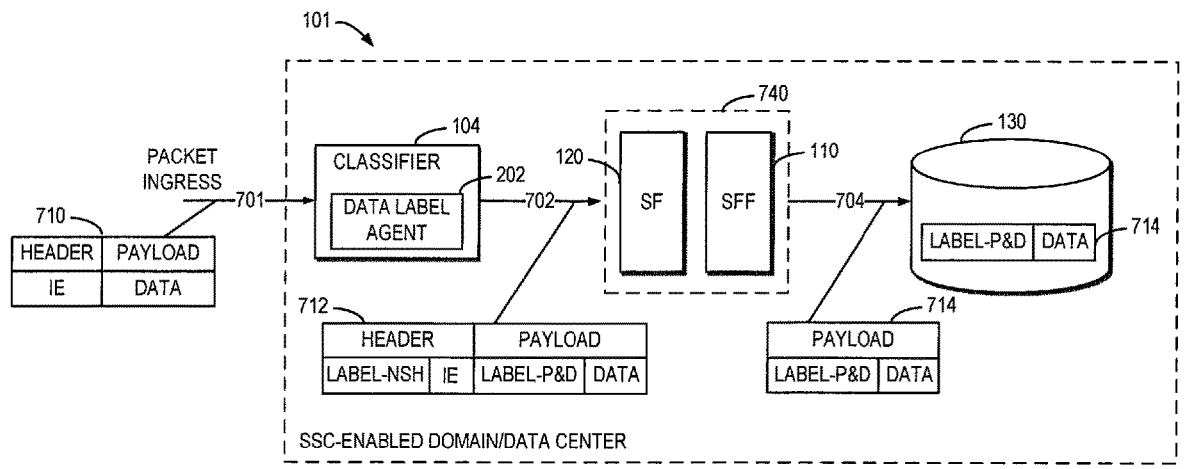
FIGS. 7A-7C are examples of processing within the Security Service Chain (SSC)-enabled domain in the system of FIG. 1 according to some embodiments of the present disclosure.

FIG. 7A illustrates an example where the classifier 104 receives 701 a packet 710 includes no label. The packet 710 includes only normal information element (IE) in the header and data in the payload. The packet 710 may be collected from a data collecting point. The data label agent 202 in the classifier 104 may determine one or more data labels for the packet 710 and insert the data labels into the packet 710 to generate a packet 712. The packet 712 includes Label-NSH in the header and Label-P & D in the payload part in addition to the original header and payload of the packet 710. In some examples, one of the Label-NSH and Label-P & D may be included in the packet 712, depending on the labels determined by the data label agent 202 in the classifier 104 for the packet 710.

The classifier 104 then selects a SSC 740 based on the determined labels and transmits 702 the packet 712 into the SSC 740. The SSC 740 includes one or more SFs 120 to process the data payload in the packet 712 for purpose of security protection. The SSC 740 also includes one or more SFFs 110 associated with the SFs 120 to forward the data payload of the packet 712 to the associated SFs 120 and forward the processed data payload of the packet 712 to the next SFs 120 according to the header of the packet 712. Generally the SFFs 110 adds the header for the purpose of transportation among the SFs 120, and deletes the header if the packet is transmitted to the SFs 120 for processing or to the storage system 130 for storage. Thus, the SFF 110 transmits 704 the packet 714 including the payload part of the packet 712 only to the storage system 130. The payload (including the Label-P & D and data) of the packet 714 is stored in the storage system 130.

Figure 7B:
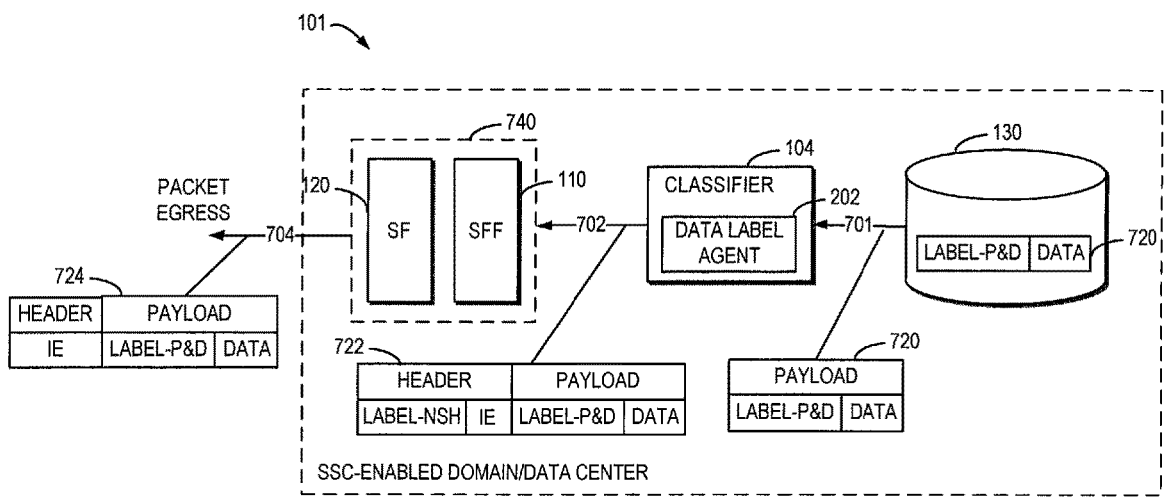

FIG. 7B illustrates an example where the classifier 104 receives 701 a packet 720 includes one or more labels that are defined according to the present disclosure. The packet 720 may be received from the storage system 130 (for example, read from the storage system in response to a data access request) and thus include Label-P & D and data in its payload part. As shown in FIG. 7B, the data label agent 202 in the classifier 104 may determine one or more labels that indicate security requirement to be satisfied during the transportation within the SSC-enabled domain/data center 101. These labels may be inserted into the header of the packet as Label-NSH, as discussed above. In some examples, the data label agent 202 in the classifier 104 may directly determine such labels. In other examples, the data label agent 202 in the classifier 104 may map the labels included in the Label-P & D part of the packet 720 to the labels to be included in the Label-NSH. The data label agent 202 in the classifier 104 may then generate a packet 722 with the Label-NSH and other IEs included in the header. The packet 722 is then transmitted 702 to the SSC 740 selected based on the Label-NSH. After processing by the SFs 120 in the SSC 740, the SFF 110 will discard the Label-NSH of the packet 722 and forward 704 a modified packet 724 out of the SSC-enabled domain/data center 101.

Figure 7C:
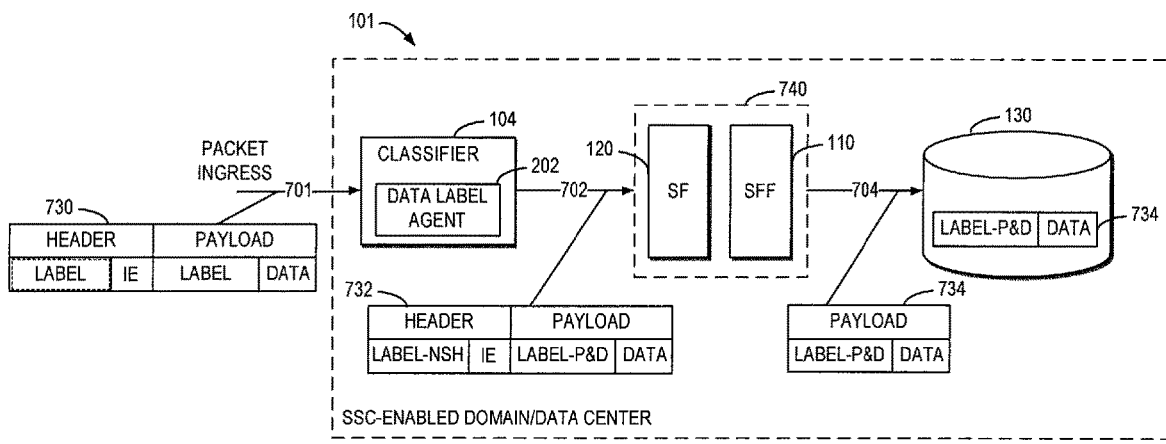

FIG. 7C illustrates an example where the classifier 104 receives 701 a packet 730 includes one or more labels. If the packet 730 includes labels that are predefined according to the present disclosure (for example, including Label-NSH in the header and Label-P & D in the payload), this packet may be received from a further storage system that is provided with similar security protection as the storage system 130. In this case, the data label agent 202 in the classifier 104 may directly use the same labels in the packet 730 in a packet 732, and the classifier 104 transmits the packet 732 to the SSC 740 selected based on the labels. If the packet 730 includes no Label-NSH, the data label agent 202 in the classifier 104 may determine one or more labels for the Label-NSH or map the labels in the payload to the Label-NSH.

If the packet 730 includes labels that are not corresponding to those predefined according to the present disclosure (for example, including labels in the payload only and are not corresponding to the data labels defined above), this packet may be received from a further storage system that operates with other data labeling schemes. In this case, the classifier 104 with the data label agent 202 may map the data labels existing in the packet 730 to those predefined in the present disclosure. Although some existing data labels included in the payload may probably indicate security requirements only for data at rest and in use, these security requirements may also help determining the corresponding requirements indicated by the data labels of the present disclosure. In some embodiments, the classifier 104 with the data label agent 202 may maintain a mapping table which indicates the mapping relationship between the predefined in the present disclosure and those defined according to the existing data labeling schemes.

The classifier 104 with the data label agent 202 may generate a packet 732 including the determined Label-NSH and Label-P & D and transmit 702 the packet 732 to the selected SSC 740. After traffic processing and data processing for purpose of security protection, the SFF 110 of the SSC 740 forwards 704 a packet 734 with the data payload of the packet 732 into the storage system 130. The payload of the packet 734 is then stored in the storage system 130.

To better illustrate some embodiments of the present disclosure, FIGS. 8-12 illustrate some example scenarios where customized security services can be provided to different packets according to the data labeling scheme of the present disclosure. In examples of FIGS. 8-12, the storage system 130 includes two cloud storages 831 and 832, which are used to store different types of data.

Figure 8:
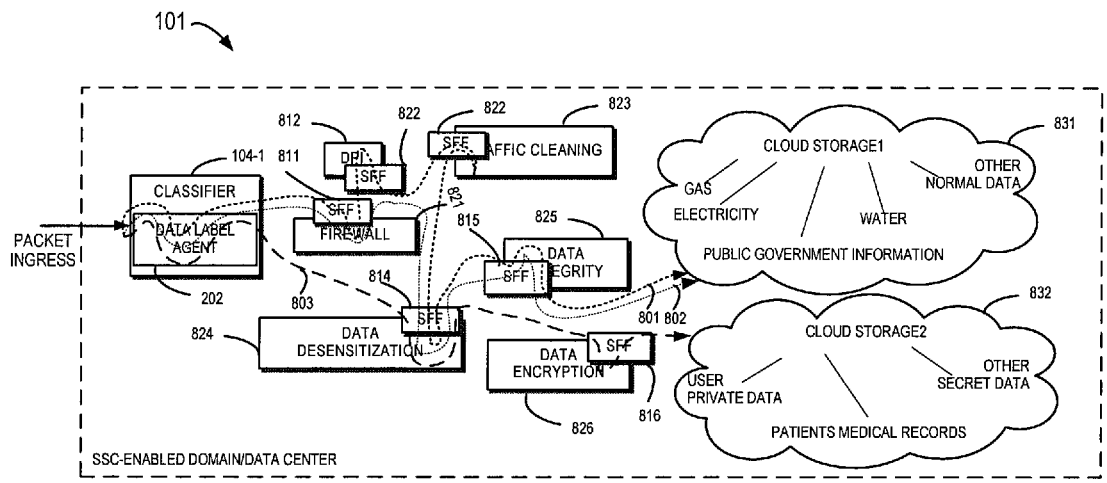
FIGS. 8-12 are some example scenarios where customized security services can be provided to different packets according to some embodiment of the present disclosure.

FIG. 8 illustrates an example to describe providing customized security service chain for data in transit and at rest while data is being imported into the storage system 130. In the scenario shown in FIG. 8, when receiving a packet including energy/utilities data to be stored into the storage system 130. The classifier 104-1 receives the packet and the data label agent 202 in the classifier 104-1 determines appropriate data bales to the energy/utilities data. According to the determined data labels (and possibly other classification rule), the classifier 104-1 inserts a security level label for data in transit and a label of industry type for the energy/utilities data. The determined labels may be inserted into the header of the packet by the classifier 104-1. The classifier 104-1 then selects, based on the determined labels, a SSC 802 deployed in the SSC-enabled domain/data center 101 for the packet. The SSC 820 is represented by a security function of Firewall 821→ a security function of Data Desensitization 824→ a security function of Data Integrity 825→ Cloud Storage 831.

The classifier 104-1 transmits the packet including the energy/utilities data into the SSC 802. In the SSC 802, the energy/utilities data is checked by Firewall 821, for example, to guarantee that the source of the energy/utilities data is correct. User's sensitive information (for example, user name, home address) included in Energy/Utilities data is removed by the security function "Data Desensitization 824" (for example, to guarantee that user privacy is protected). Integrity protection code is generated and added by security function "Data Integrity 825" (for example, to guarantee that data at rest is not modified by illegal user or application, in this way the bill of utilities will be generated correctly). The energy/utilities data is then stored into the Cloud Storage 831.

There is an alternative SSC 801 in the SSC-enabled domain/data center 101 (a security function of Firewall 821→ a security function of DPI 822→ a security function of Traffic Cleaning 823→ a security function of Data Desensitization 824→ a security function of Data Integrity 826→ Cloud Storage 831). The difference between SSC 801 and SSC 802 is whether unwanted data including virus or malware will be removed before storing Energy/Utilities data in the Cloud Storage 831. If it is determined based on other classification rule that virus or malware removal is needed, the SSC 801 may be selected. Thus, the classification policy based on data labels can work well with other classification policies without any impact.

In some cases, if the received packet includes healthcare/pharma data, the classifier may determine corresponding data labels for this packet and then select a SSC 803 for the packet (including a security function of Data Desensitization 824→ a security function of Data Encryption 826→ Cloud Storage 832). User's medical records and sensitive information (for example, name, home address) are split into two different parts by security function "Data Desensitization 824" (for example, to improve user privacy protection). Two different parts of Healthcare/Pharma data are encrypted by security function "Data Encryption 826" separately (for example, to guarantee that data at rest is not accessed by illegal user or application). Two different encrypted parts of Healthcare/Pharma data are stored in the Cloud Storage 832 separately in logical isolation or physical isolation.

In FIG. 8, each of the security functions is shown to have an associated SFF (one of SFFs 811 to 816) to perform the packet forwarding into or out of the corresponding security/service function. It would be appreciated that some or all of the SFFs may be implemented within the security functions instead of being implemented as separate logic functions.

Figure 9:
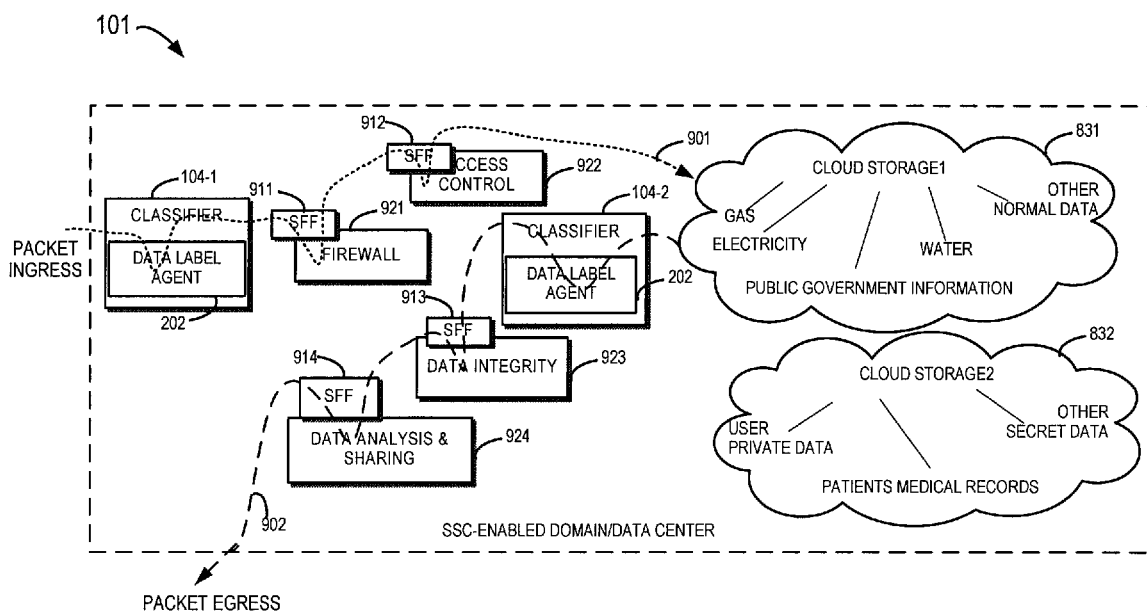

FIG. 9 shows how the utilities sector/companies securely access Energy/Utilities data in the storage system 130, and then perform data analysis and mining. The classifier 104-1 receives a packet corresponding to an access request for data stored in the storage system 130, and the data label agent 202 of the classifier 104-1 may analyse and determine what data labels are applicable to this request. The data label agent 202 of the classifier 104-1 may then insert the determined labels to the header (and possibly payload) of the packet. The classifier 104-1 selects, based on the determined labels, a SSC 901 deployed in the SSC-enabled domain/data center 101 for the packet. The SSC 901 is represented by a security function of Firewall 921→ a security function of Access Control 922→ Cloud Storage 831.

The data access request is checked by security function "Firewall 921" (for example, to guarantee that the request is valid and does not including virus or malware). The data access request is checked by security function "Access Control 922" (for example, to guarantee that the utilities sector/companies have the right to access the requested data), and then is provided to the Cloud Storage 831.

After obtaining data from the Cloud Storage 831, the data label agent 202 of the classifier 104-2 near to the Cloud Storage 831 analyses and decides what data labels are applicable to the data. The data label agent 202 in the classifier 104-2 determines and inserts corresponding labels to the payload of the data packet. The classifier 104-2 then selects, based on the determined labels, a SSC 902 deployed in the SSC-enabled domain/data center 101 for the packet. The SSC 902 is represented by a security function of Data Integrity 923→ a service function of Data analysis & sharing 924. The classifier 104-2 inserts corresponding labels into the NSH header of the packet and forwards the packet into the SSC 902 (directly to the first security function of Data Integrity 923 in the SSC 902). Data integrity is validated for the packet by the security function "Data Integrity 923," and Data analysis and mining is performed by the service function "Data analysis & sharing 924."

In FIG. 9, each of the security functions is shown to have an associated SFF (one of SFFs 911 to 914) to perform the packet forwarding into or out of the corresponding security/service function. It would be appreciated that some or all of the SFFs may be implemented within the security functions instead of being implemented as separate logic functions.

Figure 10:
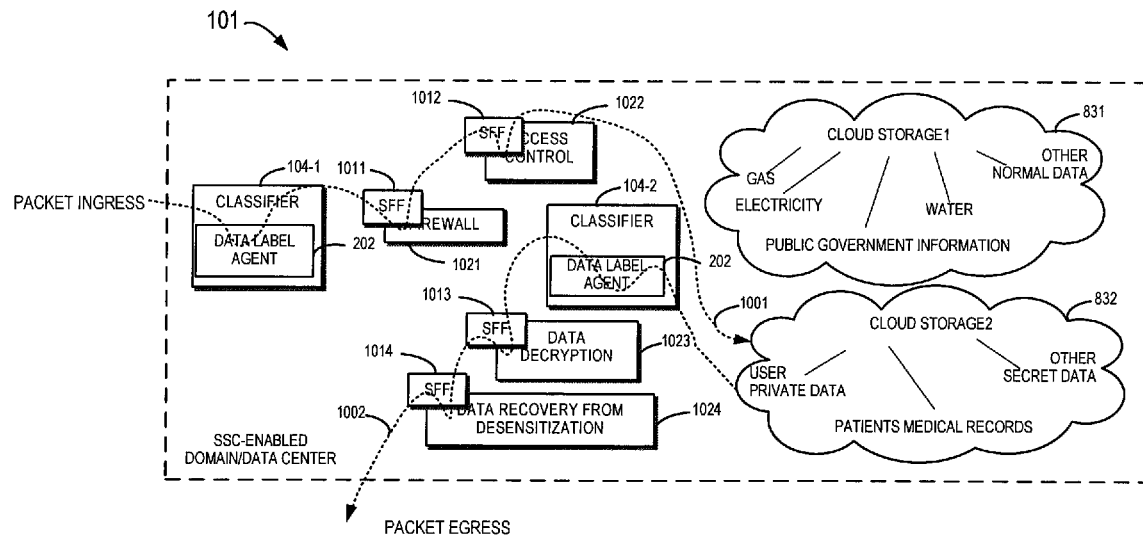

FIG. 10 shows how a doctor securely accesses patient's medical records stored in the storage system 130 and then performs integration and analysis of medical records. The classifier 104-1 receives a packet corresponding to an access request for data stored in the storage system 130, and the data label agent 202 of the classifier 104-1 may analyse and determine what data labels are applicable to this request. The data label agent 202 of the classifier 104-1 may then insert the corresponding labels to the payload of the packet. The classifier 104-1 then selects, based on the determined labels, a SSC 1001 deployed in the SSC-enabled domain/data center 101 for the packet. The SSC 1001 is represented by a security function of Firewall 1021→ a security function of Access Control 1022→ Cloud Storage 832. The classifier 104-1 inserts corresponding labels into the NSH header of the packet and forwards the packet into the SSC 1002 (directly to the first security function of Firewall 1021 in the SSC 1002).

The data access request is checked by the security function "Firewall 1021" (for example, to guarantee that the request is valid and does not including virus or malware). The data access request is checked by the security function "Access Control 1022" (for example, to guarantee that the doctor has the right to access the requested medical records).

After obtaining data from the Cloud Storage 832, the data label agent 202 of the classifier 104-2 near to the Cloud Storage 831 analyses and decides what data labels are applicable to the data. The data label agent 202 of the classifier 104-2 inserts the corresponding labels to the payload of the data packet. The classifier 104-1 then selects, based on the determined labels, a SSC 1002 deployed in the SSC-enabled domain/data center 101 for the packet. The SSC 1002 is represented by a security function of Data Decryption 1023→ a service function of Data recovery from desensitization 1024. The classifier 104-1 inserts corresponding labels into the NSH header of the packet and forwards the packet into the SSC 1023 (directly to the first security function of Data Decryption 1023 in the SSC 1002). Data decryption is performed by the security function "Data Decryption 1023." One or more medical records are integrated by the service function "Data recovery from desensitization 1024."

In FIG. 10, each of the security functions is shown to have an associated SFF (one of SFFs 1011 to 1014) to perform the packet forwarding into or out of the corresponding security/service function. It would be appreciated that some or all of the SFFs may be implemented within the security functions instead of being implemented as separate logic functions.

Figure 11:
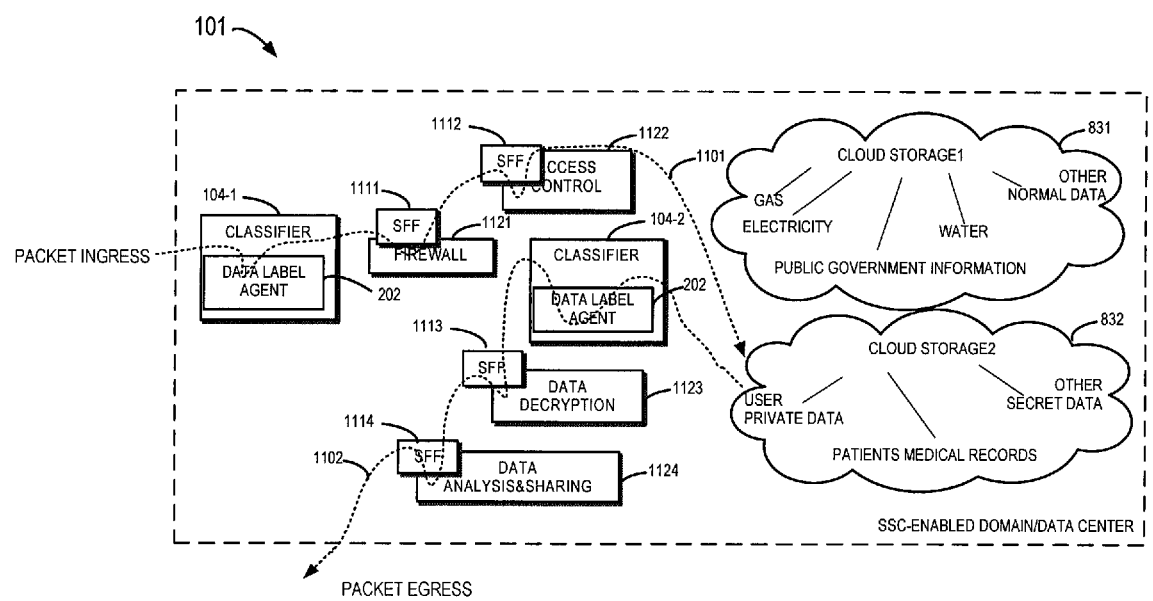
Figure 12:
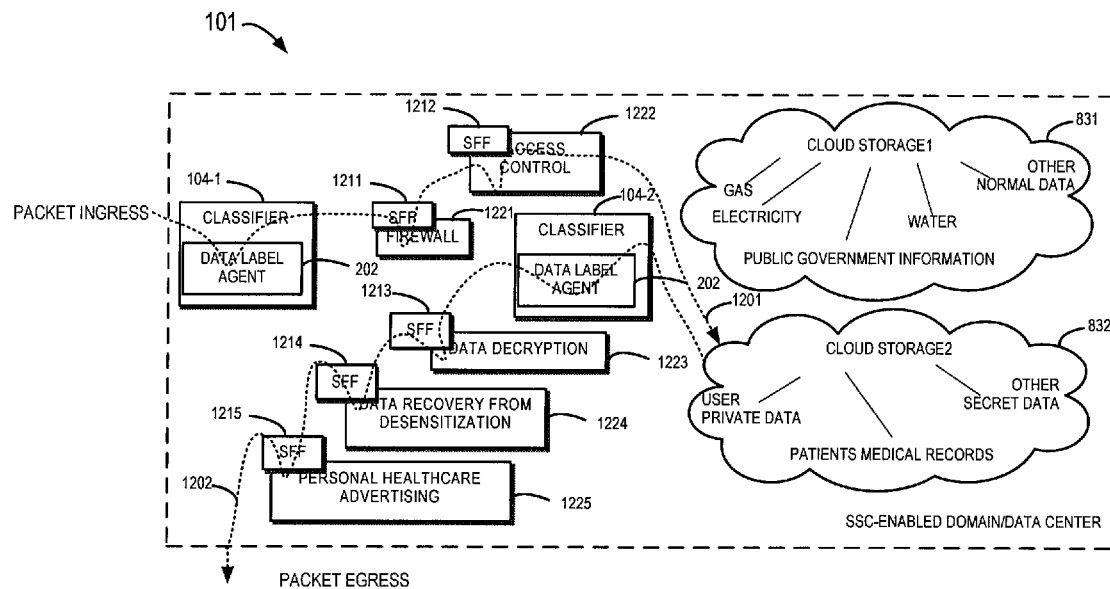

FIG. 11 and FIG. 12 show how to securely share Healthcare/Pharma data with third parties so that personal targeted advertising on medicine, medical insurance, and medical instruments can be generated and published. In FIG. 11, the classifier 104-1 receives a packet corresponding to an access request for data stored in the storage system 130, and the data label agent 202 of the classifier 104-1 may analyse and determine what data labels are applicable to this request. The data label agent 202 of the classifier 104-1 may then insert the corresponding labels to the payload of the packet. The classifier 104-1 then selects, based on the determined labels, a SSC 1101 deployed in the SSC-enabled domain/data center 101 for the packet. The SSC 1101 is represented by a security function of Firewall 1121→ a security function of Access Control 1122→ Cloud Storage 832. The classifier 104-1 inserts corresponding labels into the NSH header of the packet and forwards the packet into the SSC 1101 (directly to the first security function of Firewall 1121 in the SSC 1101).

The data access request is checked by the security function "Firewall 1121" (for example, to guarantee that the request is valid and does not including virus or malware).

The data access request is checked by the security function "Access Control 1122" (for example, to guarantee that the third party has the right to access the requested Healthcare/Pharma data). In this way, the security requirement for the packet can be satisfied by the two security functions for the transportation of the access request and access of the data to be accessed by the access request.

After obtaining data from the Cloud Storage 832, the data label agent 202 of the classifier 104-2 near to the Cloud Storage 831 analyses and decides what data labels are applicable to the data. The data label agent 202 of the classifier 104-2 inserts the determined labels to the payload of the data packet. The classifier 104-2 then selects, based on the determined labels, a SSC 1102 deployed in the SSC-enabled domain/data center 101 for the packet. The SSC 1102 is represented by a security function of Data Decryption 1123→ a service function of Data analysis & sharing 1124. The classifier 104-2 inserts corresponding labels into the NSH header of the packet and forwards the packet into the SSC 1102 (directly to the first security function of Data Decryption 1123 in the SSC 1102). Data decryption is performed by the security function "Data Decryption 1123." Healthcare/Pharma data is analysed by the service function "Data analysis & sharing 1124." In the example of FIG. 11, the SSCs1101 and 1102 may enable securely share Healthcare/Pharma data with third parties.

In FIG. 12, the classifier 104-1 receives a packet corresponding to an access request for data stored in the storage system 130, and the data label agent 202 of the classifier 104-1 may analyse and determine what data labels are applicable to this request. The data label agent 202 of the classifier 104-1 may then insert the determined labels to the payload of the packet. The classifier 104-1 then selects a SSC, based on the determined labels, 1201 deployed in the SSC-enabled domain/data center 101 for the packet. The SSC 1201 is represented by a security function of Firewall 1221→ a security function of Access Control 1222→ Cloud Storage 832. The classifier 104-1 inserts corresponding labels into the NSH header of the packet and forwards the packet into the SSC 1201 (directly to the first security function of Firewall 1221 in the SSC 1201).

The data access request is checked by the security function "Firewall 1221" (for example, to guarantee that the request is valid and does not including virus or malware). The data access request is checked by the security function "Access Control 1222" (for example, to guarantee that the third party has the right to do personal healthcare advertising according to the determined labels). In this way, the security requirement for the packet can be satisfied by the two security functions for the transportation of the access request and access of the data to be accessed by the access request.

After obtaining data from the Cloud Storage 832, the data label agent 202 of the classifier 104-2 near to the Cloud Storage 831 analyses and decides what data labels are applicable to the data. The data label agent 202 of the classifier 104-2 inserts the determined labels to the header (and possibly to the payload) of the data packet. The classifier 104-2 then selects, based on the determined labels, a SSC 1202 deployed in the SSC-enabled domain/data center 101 for the packet. The SSC 1202 is represented by a security function of Data Decryption 1223→ a service function of Data recovery from desensitization 1224→ a service function of Personal healthcare advertising 1225. The classifier 104-2 inserts corresponding labels into the NSH header of the packet and forwards the packet into the SSC 1202 (directly to the first security function of Data Decryption 1223 in the SSC 1202).

Data decryption is performed by the security function "Data Decryption 1223." User personal data is recovered by the service function "Data recovery from desensitization 1224." Personal healthcare advertising is performed by the service function "Personal healthcare advertising 1225." In the example of FIG. 12, the SSCs1201 and 1202 may enable personal healthcare advertising without violating the user's privacy.

In FIGS. 11 and 12, each of the security functions is shown to have an associated SFF (one of SFFs 1111 to 1114 or SFFs 1211 to 1214) to perform the packet forwarding into or out of the corresponding security/service function. It would be appreciated that some or all of the SFFs may be implemented within the security functions instead of being implemented as separate logic functions.

Figure 13:
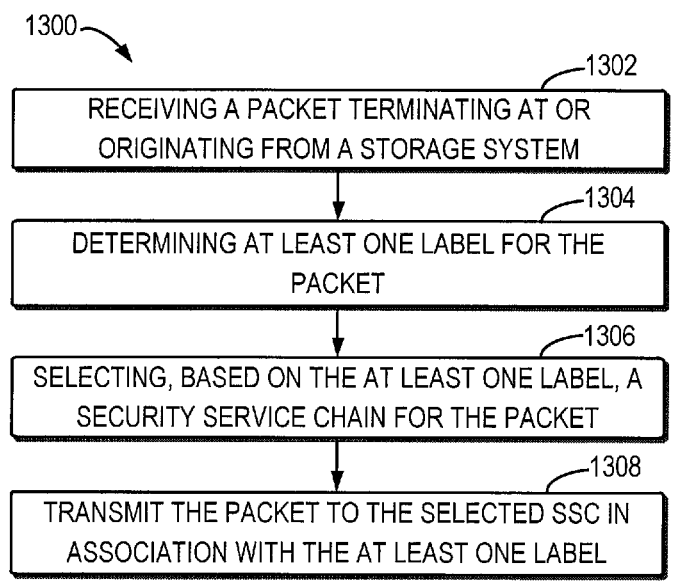
FIG. 13 is a flowchart an example method of providing a security service for a data center in accordance with some embodiments of the present disclosure.

FIG. 13 shows a flowchart of an example method 1300 of providing a security service for a data center in accordance with some embodiments of the present disclosure. The method 1300 can be implemented by the data label agent 202 and the classifier 104 as shown in FIG. 2. For purpose of discussion, the method 1300 is described with reference to FIGS. 1 to 3.

At block 1302, the classifier 104 receives a packet terminating at or originating from the data center 101. At block 1304, the data label agent 202 in the classifier 104 determines at least one label for the packet, each label indicating a security requirement for the packet. At block 1306, the classifier 104 selects, based on the at least one label, a SSC for the packet, the SSC including an ordered set of security functions deployed in the data center and to be applied to the packet. At block 1308, the classifier 104 transmits the packet to the selected SSC in association with the at least one label, the packet being processed by the ordered set of security functions in the SSC.

In some embodiments, the classifier 104 may select the security service chain such that at least one security function in the ordered set is applied to process the packet to meet the security requirement indicated by the at least one label.

In some embodiments, the data label agent 202 in the classifier 104 may determine a first label for the packet, the first label indicating a security requirement for transmission of the packet in the SSC. The first label may be a security level label for data in transit 322 in the example of FIG. 3.

In some embodiments, the classifier 104 may modify the packet by inserting the first label into a header of the packet, and then the classifier 104 may transmit the modified packet to the SSC.

In some embodiments, the packet includes data to be stored or having been stored in the data center. In some embodiments, the data label agent 202 in the classifier 104 may determine at least one of the following for the packet: a second label indicating a security requirement for storage of the data in the data center, and a third label indicating a security requirement for access of the data in the data center. The second label may be a security level label for data in transit 324 in the example of FIG. 3. The third label may be a security level label for data in transit 326 in the example of FIG. 3.

In some embodiments, the data label agent 202 in the classifier 104 may modify the packet by inserting the determined at least one of the second and third labels into a payload part of the packet, and then the classifier 104 may transmit the modified packet to the SSC.

In some embodiments, the packet includes data to be stored or having been stored in the data center. In some embodiments, the data label agent 202 in the classifier 104 may determine a fourth label for the packet, the fourth label indicating a security requirement associated with at least one of the following: a geographic location where the data were generated, a storage technology being used by the data center, and an industry type of the data. The fourth label may include one or more of a label of industry type 332, a label of technology 334, and a label of geography 336 in the example of FIG. 3.

In some embodiments, the data label agent 202 may modify the packet by inserting the fourth label into a payload part of the packet. The classifier 104 may modify the packet by inserting the fourth label into a header of the packet. Then the classifier 104 may transmit the modified further packet to the SSC.

In some embodiments, the classifier 104 may prevent, based on the fourth label, the data included in the packet from being transmitted through a network zone where a further packet is transmitted.

In some embodiments, the classifier 104 may prevent, based on the fourth label, the data included in the packet from being transmitted into a first predetermined geographic region or outside a second predetermine geographic region.

In some embodiments, the classifier 104 may prevent, based on the fourth label, from being stored into a storage region of the data center for storing data of a further packet.

In some embodiments, the storage region may be located in a geographic location that is prohibited from storing the data included in the packet.

In some embodiments, the data label agent 202 in the classifier 104 may, in response to receiving the packet from a further data center, determine a further label for the packet, the further label indicating a format of the packet associated with the further data center. The further label may be a data format label 330 in the example of FIG. 3. In some embodiments, the classifier 104 may transmit the packet to the SSC in association with the further label.

In some embodiments, the data label agent 202 in the classifier 104 may determine whether the packet includes a predefined label from a set of predefined labels. In response to determining that the packet includes the predefined label, the data label agent 202 in the classifier 104 may map the predefined label to the at least one label. In response to no predefined label is included in the packet, the data label agent 202 in the classifier 104 may select the at least one label from the set of predefined labels.

In some embodiments, the data label agent 202 in the classifier 104 may determine whether the packet includes a legacy label, the legacy label being excluded from the set of predefined labels. In response to determining that the packet includes the legacy label, the data label agent 202 in the classifier 104 may select the at least one label based on the legacy label.

In some embodiments, the SFC may include at least one of the following security functions: a firewall, access control, entity authentication, unified threat management (UTM), intrusion detection system (IDS), intrusion prevention system (IPS), virtual private network (VPN), security gateway, deep packet inspection (DPI), lawful intercept (LI), traffic cleaning, data integrity validation, data confidentiality protection, data desensitization, data encryption, and data decryption.

It is to be understood that all operations and features related to the classifier 104 with the data label agent 202 described above are likewise applicable to the method 1300 and have similar effects. For the purpose of simplification, the details will be omitted.

Figure 14:
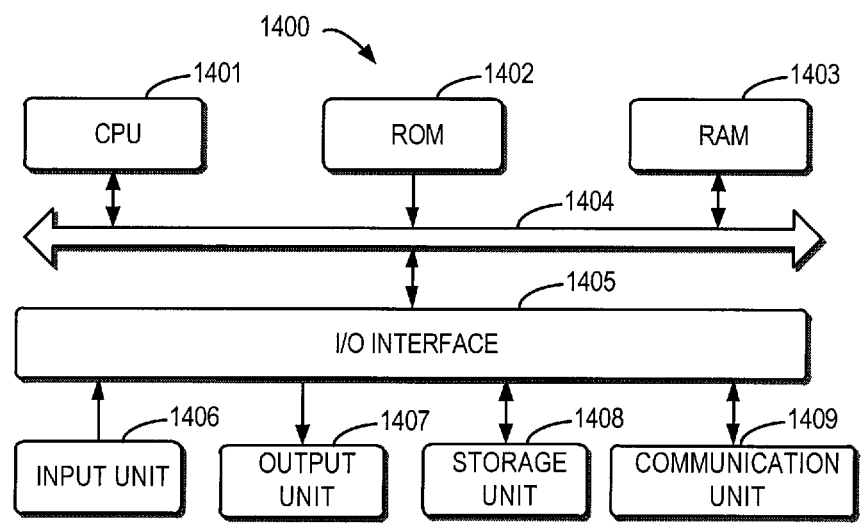
FIG. 14 is a schematic block diagram for implementing an example device for implementing embodiments of the present disclosure.

FIG. 14 is a schematic block diagram for implementing an example device 1400 for implementing embodiments of the present disclosure. The device 1400 may implement the data label agent 202, the classifier 104, and/or the SSC controller 102 of FIG. 1 or may be part of the data label agent 202, the classifier 104, and/or the SSC controller 102.

As shown, the device 1400 includes a central processing unit (CPU) 1401 which is capable of performing various suitable acts and processes in accordance with computer program instructions stored in a read-only memory (ROM) 1402 or loaded to a random access memory (RAM) 1403 from a storage unit 1408. In the RAM 1403, various programs and data required for operations of the device 1400 may also be stored. The CPU 1401, ROM 1402 and RAM 1403 are interconnected via a bus 1404. An input/output (I/O) interface 1404 is also connected to the bust 1404.

Various components in the device 1400 are connected to the I/O interface 1405, including an input unit 1406, such as a keyboard, mouse, and the like; an output unit 1407 such as various displays, loudspeakers, and the like; a storage unit 1408 such as a magnetic disk, an optical disk, and the like; and a communication unit 1409 such as a network card, a modem, a radio communication transceiver, and the like. The communication unit 1409 enables the device 1400 to communicate information/data with other devices via a computer network such as Internet, and/or various telecommunication networks.

Various methods and processing described above, such as the method 1300, may be implemented with the processing unit 1401. For example, in some embodiments, the method 1300 may be implemented as a computer software program which is tangibly included in a machine readable medium, such as a storage unit 1408. In some embodiments, part or all of the computer programs may be loaded and/or installed to the device 1400 via the ROM 1402 and/or communication unit 1409. When the computer program is loaded to the RAM 1403 and executed by the CPU 1401, one or more steps of the method 1300 described above may be performed. Alternatively, in other embodiments, the CPU 1401 may be configured to perform the method 1300 in any other appropriate manners (for example, by means of firmware).

The components included in the apparatuses and/or devices of the present disclosure may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the apparatuses and/or devices may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 1-13. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific embodiment details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method, comprising
receiving a packet terminating at or originating from a data center, wherein the packet comprises data to be stored or having been stored in the data center;
determining labels for the packet, each label indicating a security requirement for the packet, comprising
determining a first label for the packet, the first label indicating a security requirement for transmission of the packet in the security service chain and
determining at least one of the following for the packet:
a second label indicating a security requirement for storage of the data in the data center or
a third label indicating a security requirement for access of the data in the data center;
selecting, based on the determined labels, a security service chain for the packet, the security service chain comprising an ordered set of security functions that are deployed in the data center and to be applied to the packet; and
transmitting the packet to the selected security service chain in association with the determined labels, the packet being processed by the ordered set of security functions in the security service chain.

2. The method of claim 1, wherein selecting the security service chain comprises:
selecting the security service chain such that at least one security function in the ordered set is applied to process the packet to meet the security requirement indicated by the at least one label.

3. The method of claim 1, wherein transmitting the packet comprises:
modifying the packet by inserting the first label into a header of the packet; and
transmitting the modified packet to the security service chain.

4. An apparatus, comprising:
a processor; and
a memory coupled to the processor and storing instructions thereon, the instructions, when executed by the processor, configured to cause the apparatus to:
receive a packet terminating at or originating from a data center, wherein the packet comprises data to be stored or having been stored in the data center;
determine labels for the packet, each label indicating a security requirement for the packet, by at least
determining a first label for the packet, the first label indicating a security requirement for transmission of the packet in the security service chain and
determining at least one of the following for the packet:
a second label indicating a security requirement for storage of the data in the data center or
a third label indicating a security requirement for access of the data in the data center;
select, based on the determined labels, a security service chain for the packet, the security service chain comprising an ordered set of security functions that are deployed in the data center and to be applied to the packet; and transmit the packet to the selected security service chain in association with the determined labels, the packet being processed by the ordered set of security functions in the security service chain.

5. The apparatus of claim 4, wherein the selecting of the security service chain further comprises:
selecting the security service chain such that at least one security function in the ordered set is applied to process the packet to meet the security requirement indicated by the at least one label.

6. The apparatus of claim 4, wherein the transmitting of the packet comprises:
modifying the packet by inserting the first label into a header of the packet; and
transmitting the modified packet to the security service chain.

7. The apparatus of claim 4, wherein the transmitting of the packet further comprises:
modifying the packet by inserting the determined at least one of the second or third labels into a payload part of the packet; and
transmitting the modified packet to the security service chain.

8. The apparatus of claim 4, wherein the packet comprises data to be stored or having been stored in the data center, and wherein the determining of the labels further comprises:
determining a fourth label for the packet, the fourth label indicating a security requirement associated with at least one of the following:
a geographic location where the data were generated,
a storage technology being used by the data center, and
an industry type of the data.

9. The apparatus of claim 8, wherein the apparatus is further caused to:
prevent, based on the fourth label, the data comprised in the packet from being transmitted through a network zone where a further packet is transmitted.

10. The apparatus of claim 8, wherein the apparatus is further caused to:
prevent, based on the fourth label, the data comprised in the packet from being transmitted into a first predetermined geographic region or outside a second predetermine geographic region.

11. The apparatus of claim 8, wherein the apparatus is further caused to:
prevent, based on the fourth label, the data comprised in the packet from being stored into a storage region of the data center for storing data of a further packet.

12. The apparatus of claim 11, wherein the storage region is located in a geographic location that is prohibited from storing the data comprised in the packet.

13. The apparatus of claim 8, wherein the transmitting of the packet further comprises:
modifying the packet by inserting the fourth label into at least one of a header and a payload part of the packet; and
transmitting the modified further packet to the security service chain.

14. The apparatus of claim 4, wherein the apparatus is further caused to:
in response to the receiving of the packet from a further data center, determine a further label for the packet, the further label indicating a format of the packet associated with the further data center, and wherein the transmitting of the packet further comprises;
transmit the packet to the security service chain in association with the further label.

15. The apparatus of claim 4, wherein the determining of the labels further comprises:
determining whether the packet comprises a predefined label from a set of predefined labels;
in response to the determining that the packet comprises the predefined label, mapping the predefined label to the at least one label; and
in response to no predefined label is comprised in the packet, selecting the at least one label from the set of predefined labels.

16. The apparatus of claim 15, wherein the selecting of the determined labels further comprises:
determining whether the packet comprises a legacy label, the legacy label being excluded from the set of predefined labels; and
in response to the determining that the packet comprises the legacy label, selecting the at least one label based on the legacy label.

17. The apparatus of claim 4, wherein the security service chain comprises at least one of the following security functions: a firewall, access control, entity authentication, unified threat management, intrusion detection system, intrusion prevention system, virtual private network, security gateway, deep packet inspection, Lawful Intercept, traffic cleaning, data integrity validation, data confidentiality protection, data desensitization, data encryption, and data decryption.

18. A non-transitory computer readable medium comprising program instructions that, when executed by an apparatus, cause the apparatus to perform at least the following:
receiving a packet terminating at or originating from a data center, wherein the packet comprises data to be stored or having been stored in the data center;
determining labels for the packet, each label indicating a security requirement for the packet, comprising
determining a first label for the packet, the first label indicating a security requirement for transmission of the packet in the security service chain and
determining at least one of the following for the packet:
a second label indicating a security requirement for storage of the data in the data center or
a third label indicating a security requirement for access of the data in the data center;
selecting, based on the determined labels, a security service chain for the packet, the security service chain comprising an ordered set of security functions that are deployed in the data center and to be applied to the packet; and
transmitting the packet to the selected security service chain in association with the determined labels, the packet being processed by the ordered set of security functions in the security service chain.

19. The non-transitory computer readable medium of claim 18, wherein selecting the security service chain comprises:
selecting the security service chain such that at least one security function in the ordered set is applied to process the packet to meet the security requirement indicated by the at least one label.

20. The non-transitory computer readable medium of claim 18, wherein transmitting the packet comprises:
modifying the packet by inserting the first label into a header of the packet; and transmitting the modified packet to the security service chain.

* * * * *